(12) United States Patent
Pallmann

(10) Patent No.: US 7,311,511 B2
(45) Date of Patent: Dec. 25, 2007

(54) APPARATUS FOR CONVERTING FREE-FLOWING, AT LEAST PARTIALLY THERMOPLASTIC FEED MATERIAL, INTO GRANULES, AGGLOMERATES, PELLETS, COMPACTS, AND THE LIKE

(75) Inventor: Hartmut Pallmann, Zweibruecken (DE)

(73) Assignee: Pallmann Maschinenfabrik GmbH, Zweibruecken (DE)

( * ) Notice: Subject to any disclaimer, the term of this patent is extended or adjusted under 35 U.S.C. 154(b) by 0 days.

(21) Appl. No.: 11/499,648

(22) Filed: Aug. 7, 2006

(65) Prior Publication Data
US 2007/0029692 A1 Feb. 8, 2007

(30) Foreign Application Priority Data
Aug. 6, 2005 (DE) .................... 10 2005 037 177

(51) Int. Cl.
*B29B 9/06* (2006.01)
(52) U.S. Cl. .................. 425/382 R; 425/311; 425/331; 425/382.3; 425/DIG. 230
(58) Field of Classification Search ........... 425/311, 425/331, 382 R, 382.3, DIG. 230; 100/903, 100/907
See application file for complete search history.

(56) References Cited

U.S. PATENT DOCUMENTS 5,009,586 A 4/1991 Pallmann 5,242,292 A * 9/1993 Wenger ..................... 425/311
6,099,288 A * 8/2000 Long ........................ 425/331
6,551,090 B2 * 4/2003 Pallmann ................ 425/382 R

FOREIGN PATENT DOCUMENTS

| DE | 26 14 730 | 10/1977 |
|---|---|---|
| DE | 32 10 974 A1 | 10/1983 |
| DE | 34 42 072 C1 | 12/1989 |
| GB | 1 560 927 | 2/1980 |

* cited by examiner

*Primary Examiner*—James P. Mackey
(74) *Attorney, Agent, or Firm*—Geissler, Olds, Lowe & Richardson

(57) ABSTRACT

An apparatus is disclosed for converting feed material into granules under the application of pressure. The apparatus includes a conveyor screw arranged about an axis of rotation with at least one screw spiral, a rotationally symmetric working chamber arranged about the axis of rotation, which chamber is formed by two annular walls arranged at an axial distance from one another and by an annular perforated die. The annular wall has a central opening arranged coaxial to the axis of rotation into which the conveyor screw discharges in order to feed the working chamber with feed material. The apparatus also includes a pressure element that rotates about the axis of rotation and has at least one pressure arm, which extends from the axis of rotation toward the perforated die delivers the axially supplied feed material to the perforated die in the radial direction, and compacts it while doing so.

14 Claims, 5 Drawing Sheets

APPARATUS FOR CONVERTING FREE-FLOWING, AT LEAST PARTIALLY THERMOPLASTIC FEED MATERIAL, INTO GRANULES, AGGLOMERATES, PELLETS, COMPACTS, AND THE LIKE

This nonprovisional application claims priority under 35 U.S.C. § 119(a) to German Patent Application No. DE 102005037177, which was filed in Germany on Aug. 6, 2005, and which is herein incorporated by reference.

BACKGROUND OF THE INVENTION

1. Field of the Invention

The present invention relates to an apparatus for converting free-flowing feed material into granules, agglomerates, pellets, compacts, and the like.

2. Description of the Background Art

In the manufacture of compacts, pellets, compounds, composites, agglomerates, or granules, the feed material on which the processing is based generally has a free-flowing consistency. By means of a screw press, the feed material is brought to the processing tools, where it is appropriately processed depending on its later use.

In order to manufacture simple products, such as compacts or pellets for example, it is sufficient to compact the feed material, e.g. wood (sawdust, wood fibers, shavings, wood flour) and press it through a molding tool. The qualitative requirements on the resulting product are fairly low in this context. The manufacture of high-quality granules and agglomerates from feed material of a pure type, such as PE granules for example, entails greater construction effort. To this end, the dry feed material is delivered to an agglomerator or an extruder after being compacted.

All the aforementioned processing methods start with heavy compaction of the feed material, which causes a considerable development of heat as a result of the high pressure and intense frictional forces. During the processing of thermoplastic materials, the development of heat can be influenced in such a manner that plasticizing of the feed material occurs, followed by the formation of granules and agglomerates, which then may be used as raw materials for feeding extruders, injection molding machines, presses, and the like in later production processes. Additives such as sawdust or wood fibers can also be added to the plastics to create wood/plastic composites (WPC).

During the manufacturing process, it is critically important to observe an upper temperature limit. If the temperatures in the apparatus exceed a material-specific limit value, thermal decomposition and thus chemical conversion of the feed material occurs. Such a damaged granulate is usable only for further processing into low-quality products on account of the associated degradation of chemical and physical properties.

An apparatus suitable for this described purpose is known from DE 32 10 974 A1. This apparatus has a screw press, having an annular chamber and/or a perforated plate arranged at an end opposite the intake. During the course of the axial transport of the feed material to the annular chamber or to the perforated plate, a continuous pressure buildup takes place in the screw press. To this end, the screw press can have a pitch of the screw spirals that is variable over its length, and/or a conicity. The feed material reaches its maximum pressure immediately before and during passage through the annular chamber or perforated plate, where a considerable development of heat is present as a result of the compressive and frictional forces present. In the case of thermoplastic materials, the high temperatures cause them to soften, thus making possible their passage through the annular chamber or perforated disk.

Apparatuses are also known in which the annular chamber or perforated plate at the end of the screw press is replaced by two conical grating elements arranged coaxially one inside the other while maintaining a grating gap; the surfaces of the grating elements that face one another are equipped with grating strips. Due to a relative motion of the grating elements, the feed material forced into the grating gap by the screw press is exposed to high shear forces between the grating elements, and it agglomerates as a result of the associated frictional heat.

The disadvantage of these apparatuses resides in the fact that the feed material is exposed to high compressive and shear forces as early as in the screw, so that heating of the feed material occurs at a very early point in time. Due to the accumulation of heat energy as the feed material passes through the apparatus, the maximum temperature is often exceeded before the annular chamber, pressure plate, or grating elements are reached, with the above-described disadvantages. This problem is generally addressed by the integration of cooling devices. Nevertheless, regulation of the temperature within the apparatus is very difficult, so the temperature profile exhibits a wide range of variation, and consequently only granulate of nonuniform shape and quality are produced.

In order to solve these problems, DE 38 42 072 C1, which corresponds to, U.S. Pat. No. 5,009,586, discloses an agglomerator having a conveyor screw with material intake that guides the thermoplastic feed material axially into a disk-shaped working chamber whose outer periphery constitutes an annular compaction chamber. The outer periphery of the compaction chamber is bounded by a perforated die through which the feed material is radially pressed by a rotating pressure vane after sufficient compaction and heating. Due to the sickle-shaped design of the pressure vane, a compression zone is formed that narrows opposite the direction of rotation, into which the feed material is drawn as the pressure vane rotates and is subsequently exposed to increasing compressive forces. At the same time, the forced mixing of the feed material by the rotating pressure vane leads to high shear and frictional forces, which on the whole results in a rapid autogenous development of heat in the compaction chamber and compression zone.

The temperature rise is accompanied by a softening of the thermoplastic feed material, which in turn reduces its adhesion resistance during passage through the perforated die. Thus, when this state is achieved, no further increase in compressive and shear forces is possible, since the feed material counteracts these tendencies as a result of the associated temperature increase through a reduction in viscosity. An equilibrium state is thus established in which the temperature remains below the upper temperature limit of the feed material in question.

The advantage of this apparatus thus includes an automatic regulation of the temperature in the apparatus, so that damage to the feed material resulting from thermal overstress is precluded.

In practice, such apparatuses have proven their worth due to the constant high quality of the granules produced. However, a certain range of variation among the machine outputs of various different apparatuses is notable despite the use of identical components.

SUMMARY OF THE INVENTION

It is therefore an object of the present invention to provide apparatuses of the generic type such that maximum machine output is achieved with consistently high quality of the final product.

The invention is characterized by the compaction of the feed material at as late a point in time as possible within the conversion process. In this context, the conveyor screw performs the task of axial material transport to the pressure element without producing an appreciable pressure buildup. Steadily increasing compaction does not take place until after redirection of the stream of material in the working chamber to a radial direction. Thus, it is possible for the feed material to experience a constant increase in temperature, yet not reach its maximum temperature until passage through the openings of the perforated die. In this way, the thermal stress of the feed material is reduced to the necessary degree.

These processes are greatly influenced by the material flow within the inventive apparatus and, in particular, in the area of the redirection toward the perforated die. The inventive design of this area achieves the result that, with the greatest possible flow cross-section of the feed material, an abrupt increase in volume occurs once the feed material reaches the annular compaction chamber following its redirection. As a result of the sudden increase in the flow cross-section by the cross-sectional area of the annular compaction chamber, a material vacuum arises in the direction of the perforated die, enhancing the radially outward material flow of the feed material. In this context, the large flow cross-section prior to entry into the compaction chamber permits a largely unimpeded afterflow of the feed material, minimizing pressure losses and material blockages.

In the compaction chamber, a continuously ongoing compaction of the feed material takes place through volume reduction. At the same time, the feed material in the compaction chamber is subjected to a uniform, laminar circulating motion until passage through the perforated die. These conditions contribute, firstly, to the circumstance that the temperature profile of the feed material rises continuously as it travels through the apparatus, and reaches its maximum in the vicinity of the perforated die. Secondly, a constant and uniform material flow makes it easier to maintain optimal process parameters, thus permitting production with uniform high quality at maximum machine output and low energy consumption.

In an embodiment of the invention, a relative position of the pressure element to the conveyor screw is such that the end of the screw spiral coincides with the intersection of the contact surface of the pressure arm and the central opening of the first annular wall. With this embodiment, a maximum flow cross-section is achieved in the vicinity of the redirection of the material flow, followed by an approximately uniform increase in compaction of the feed material.

The greater the deviation from this optimal relative position by an angular offset toward or away from the direction of rotation, the greater the disturbances in the material flow become, since one deviates ever further from an essentially constant material flow for the feed material up to its entry into the working chamber. This is tolerable to a certain degree depending on the type of feed material. The limit is reached, however, when the inventive advantages no longer arise. This is the case when the material flow is significantly disrupted by clogging and blockages resulting from cross-sectional narrowing. In this sense, the values stated in the patent claims are to be understood merely as limit values, and individual values lying within the limit values, for example those shown in FIG. 2, are also to be considered as disclosed.

A preferred embodiment of the invention provides that the front of the pressure arm serving as the contact surface is curved in the opposite direction of rotation. In this way, a progressively increasing compaction of the feed material in the direction of the perforated die is achieved with the advantage that the compressive forces exerted by the pressure arm are oriented essentially parallel to the passages. This minimizes pressure losses and prevents excessive generation of heat.

It also proves to be advantageous when the section of the front in the region ahead of the intersection with the central opening runs in a straight line. This results in a rapid conveying of the feed material into the annular compaction chamber.

The end face of the pressure element facing the conveyor screw can have depressions in the region of the screw spiral, so that the flow cross-section of the feed material, which, in the final section before its redirection, is formed by the pressure element and the screw spirals, is as large as possible.

A preferred embodiment of the invention provides pressure elements with two pressure arms, each of which is associated with its own screw spiral. The result is an extremely compact and effective compression and compaction unit in which the regions for redirection and the regions for compaction of the feed material stand in a balanced relationship to one another.

Another embodiment of the invention has a pressure arm in which the rear side of the pressure arm in the direction of rotation is offset by approximately 90° opposite the direction of rotation from the radial line through the point S. This achieves the result that the feed material arriving axially from the conveyor screw does not immediately encounter the end wall of the disk-shaped working chamber, but instead strikes the pressure element. As a result, the pressure arm protects the relevant end wall from excessive wear. For this purpose, the end face of the pressure element can have a depression in this area.

Since the relative position between pressure element and conveyor screw of an inventive apparatus is unchangeable, it proves to be advantageous to arrange the conveyor screw and pressure element on a common drive shaft. In this way, the synchronism of the conveyor screw and pressure element is ensured, and only one drive unit is needed to operate an inventive apparatus.

In a further embodiment of the invention, the pressure element and at least the last section of the conveyor screw associated with the pressure element are designed as a single piece. This ensures that, during assembly of the apparatus, the relative position of pressure element to conveyor screw is observed.

Alternatively, a two-piece design is possible, in which the relative position of pressure element to conveyor screw is ensured, for example, by centering pins.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
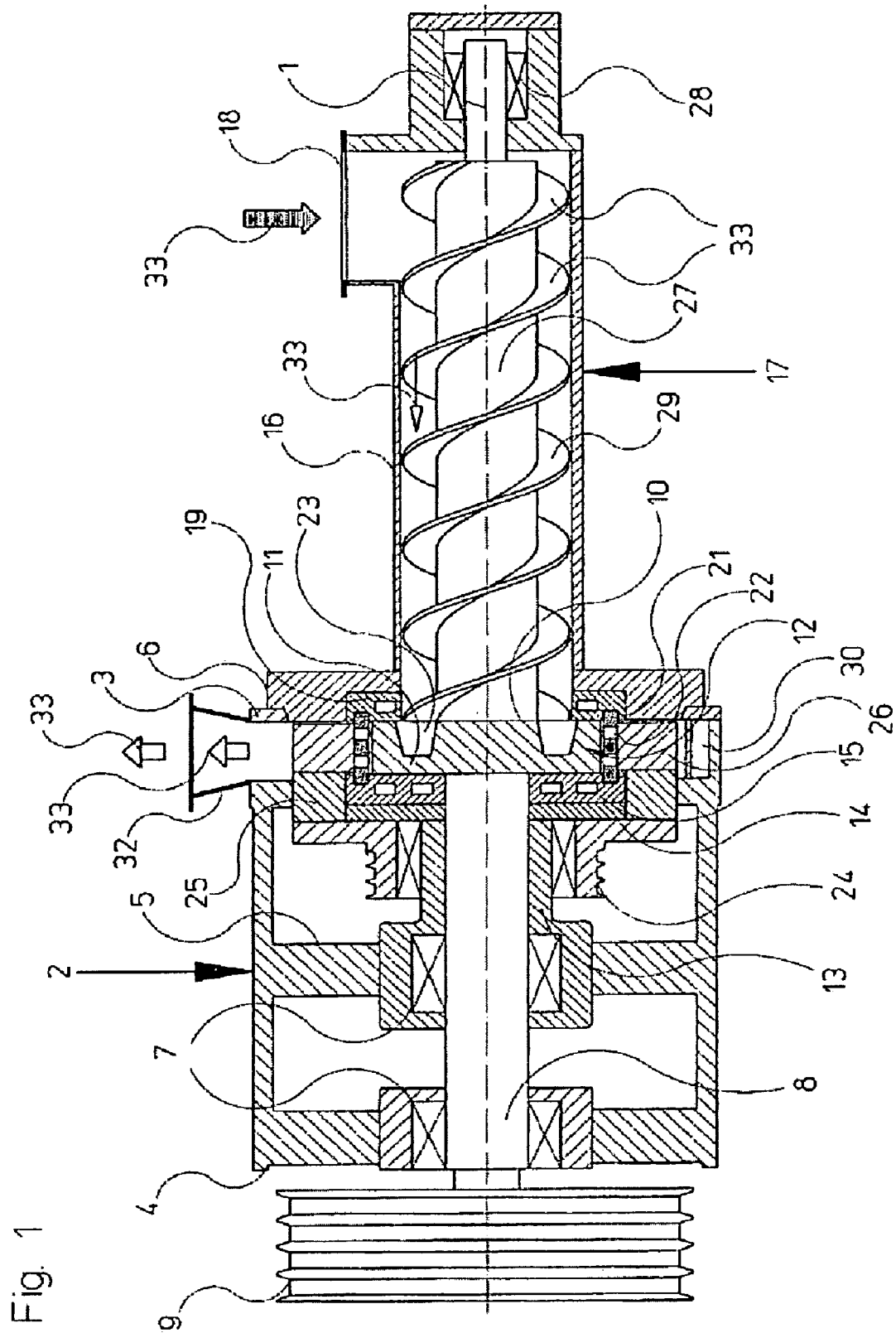
FIG. 1 is a longitudinal section through an inventive device.

FIG. 1 shows a longitudinal section through an apparatus according to an embodiment of the present invention. Shown is an approximately drum-shaped housing 2 surrounding an axis of rotation 1, whose end faces are closed off by a front wall 3 and back wall 4. The housing 2 is subdivided by a partition 5 arranged between the front wall 3 and a back wall 4. The front wall 3 has a central opening, which can be sealed by a pivoting housing door 6. The back wall 4 and the partition 5 in the vicinity of the axis of rotation 1 together form a horizontal bearing region to accommodate and pass a drive shaft 8. The end of the drive shaft 8 located outside the housing 2 bears a multiple groove pulley 9, which is connected by belts (not shown) to a drive.

Figure 2:
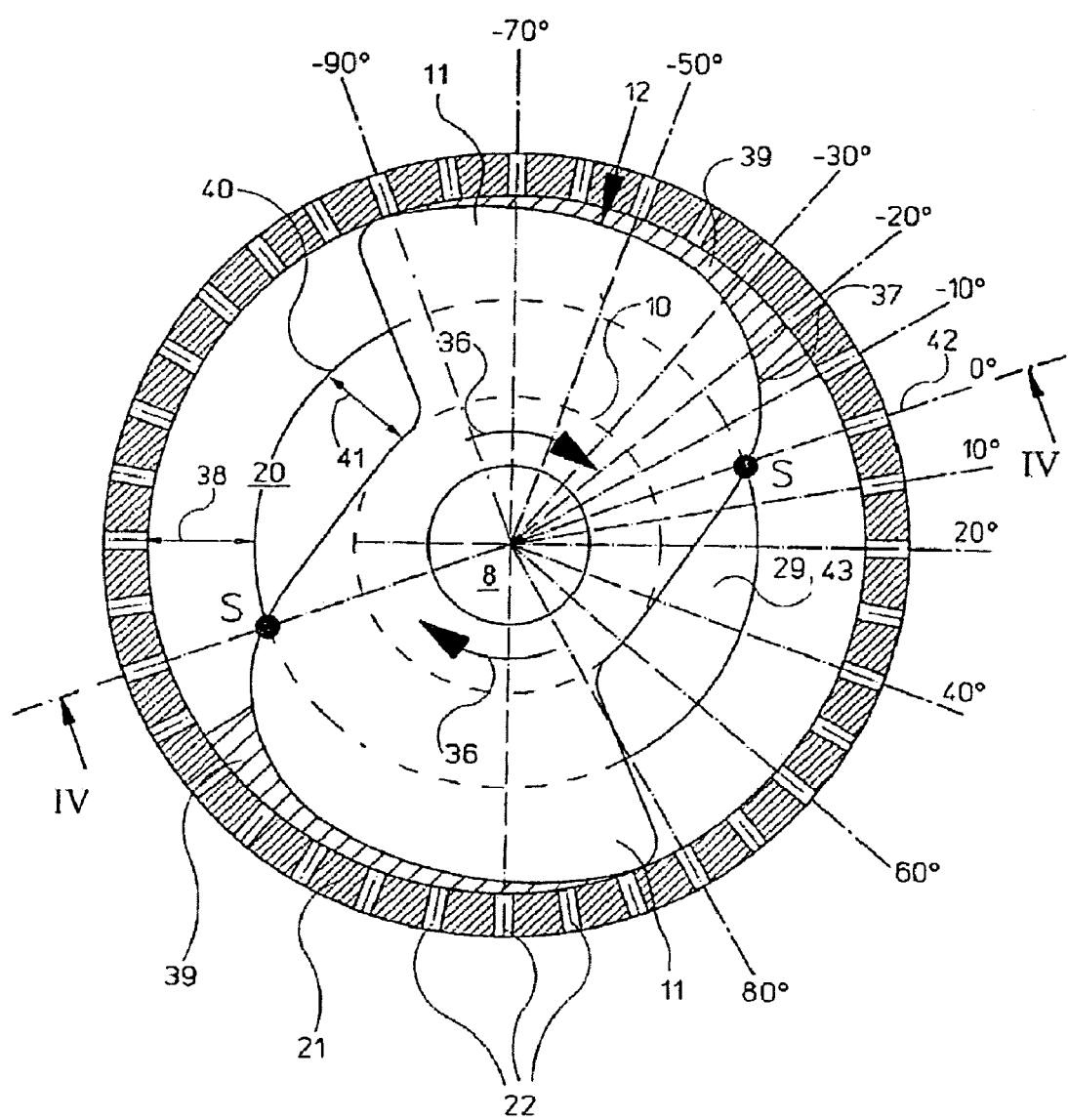
FIG. 2 is a cross-section through a subsection of the apparatus along line II-II shown in FIG. 4.
Figure 3:
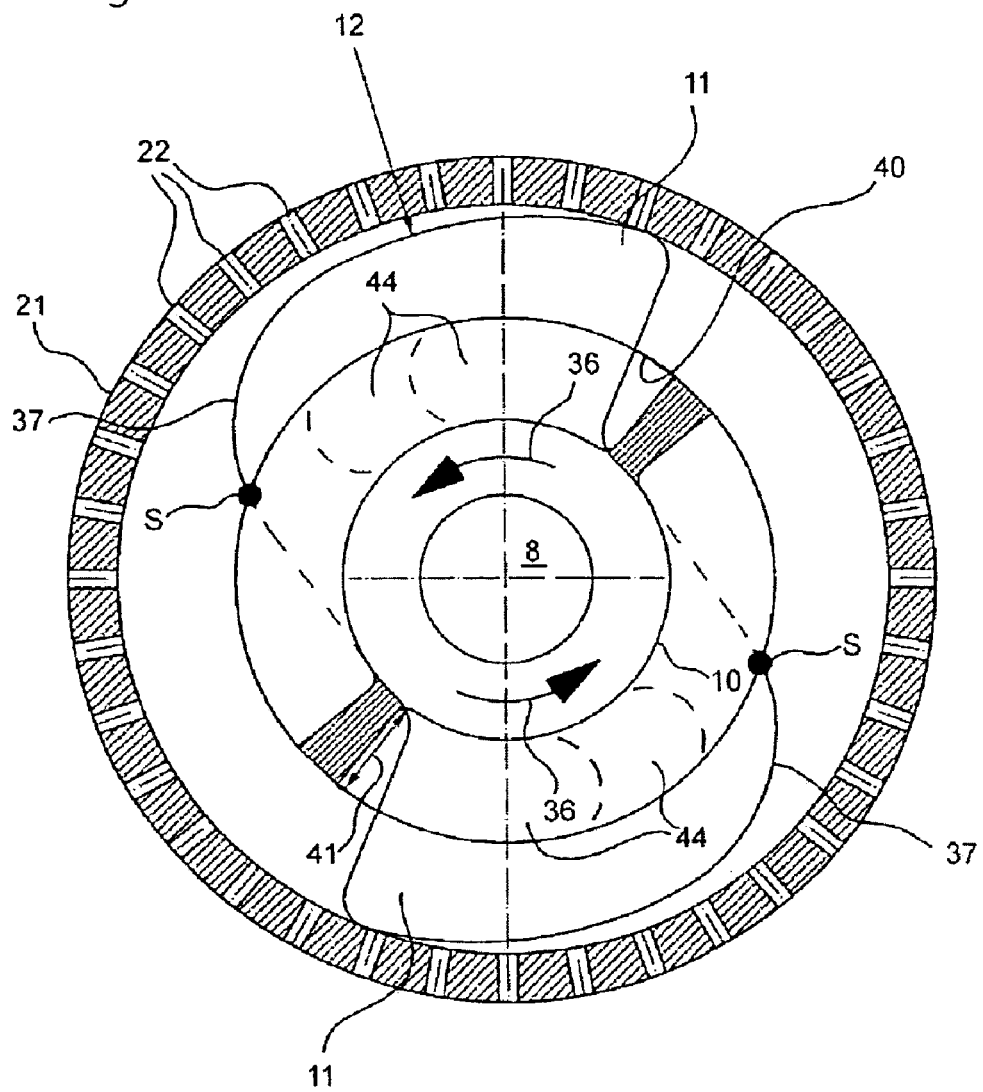
FIG. 3 is a cross-section through a subsection of the apparatus along line III-III shown in FIG. 4.

On the end of the drive shaft 8 inside the housing 2, a hub 10 sits in a rotationally fixed manner; extending from the hub are diametrically opposed sickle-shaped pressure arms 11 (FIGS. 2 and 3). The hub 10 and pressure arms 11 constitute the pressure element 12, which is set in rotational motion about the axis 1 by the drive shaft 8.

Extending from the partition 5 and rigidly attached thereto is a cylinder bearing 13 that coaxially encloses the drive shaft 8 and bears a flange 14 arranged in a radial plane at its end facing the pressure element 12. A likewise coaxial annular wall 15 adjoins the flange 14 in the axial direction toward the pressure element 12. The flange 14 and annular wall 15 together constitute a sliding connection to the hub 10.

The housing door 6 has, in the region of the axis of rotation 1, an annular opening which is adjoined by the outer sleeve 16 of a likewise coaxially arranged conveyor screw 17 with a vertical material intake 18. The conveyor screw 17 can thus be pivoted to the side during the course of opening the housing door. Visible on the inside of the housing door 6 is a second annular wall 19, which is spaced axially apart from and faces the annular wall 15, and which has a concentric opening 40. The two annular walls 15 and 19 thus constitute a coaxial, disk-shaped working chamber 20, which is bounded on the circumferential side by a perforated die 21 with passages 22, and in which the pressure element 12 rotates. The larger diameter of the opening 40 as compared to the outside diameter of the hub 10 produces an annular gap 23 through which the working chamber 20 is fed with feed material.

The cylinder bearing 13 constitutes a horizontal pivot bearing for a blade holder hub 24, which coaxially surrounds it, and from which two diametrically opposed blade holders 25 extend in the radial direction, and which serve for adjustable and replaceable fastening of cutters 26 on the outer circumference of the perforated die 21. By means of the V-belts (not shown), the blade holder hub can be set in rotation, causing cutters 26 to pass over the outer circumference of the perforated die 21. The perforated die 21 is surrounded in turn by an annular channel 30, in which the granules are collected after passing through the perforated die 21 and are drawn out of the apparatus through a material outlet 32 located on top.

The conveyor screw 17 is designed as a double lead screw. The screw core 27 corresponds to the axial extension of the drive shaft 8, and is rotatably mounted in a bearing 28 in the rear end of the housing of the conveyor screw 17. In the plane of contact, the screw core 27 and the drive shaft 8 are detachably connected to one another in a force-transmitting manner by centering pins 31. Seated on the screw core 27 are the two screw spirals 29, which wrap around the screw core 27 with a uniform pitch, thus conveying the feed material through the annular gap 23 into the working chamber 20 by means of its contact surface 43. The contact surfaces 43 of the two screw spirals 29 terminate in the radial plane between annular wall 19 and pressure element 12, where they taper off.

The flow of material through the apparatus is indicated by the arrows 33. Feeding takes place through the material intake 18 in the conveyor screw 17, which also conveys the feed material axially to the working chamber 20. After the material enters the working chamber 20, a redirection radially to the outside, toward the perforated die 21, takes place. After radial passage through the perforated die 21 and comminution by means of the cutters 26, the granulate first reaches the annular channel 30, whence it is carried out of the apparatus through the material outlet 32. The section after entry into the working chamber 20, where redirection of the material flow with subsequent compaction takes place, proves to be a critical area on this path.

Figure 4:
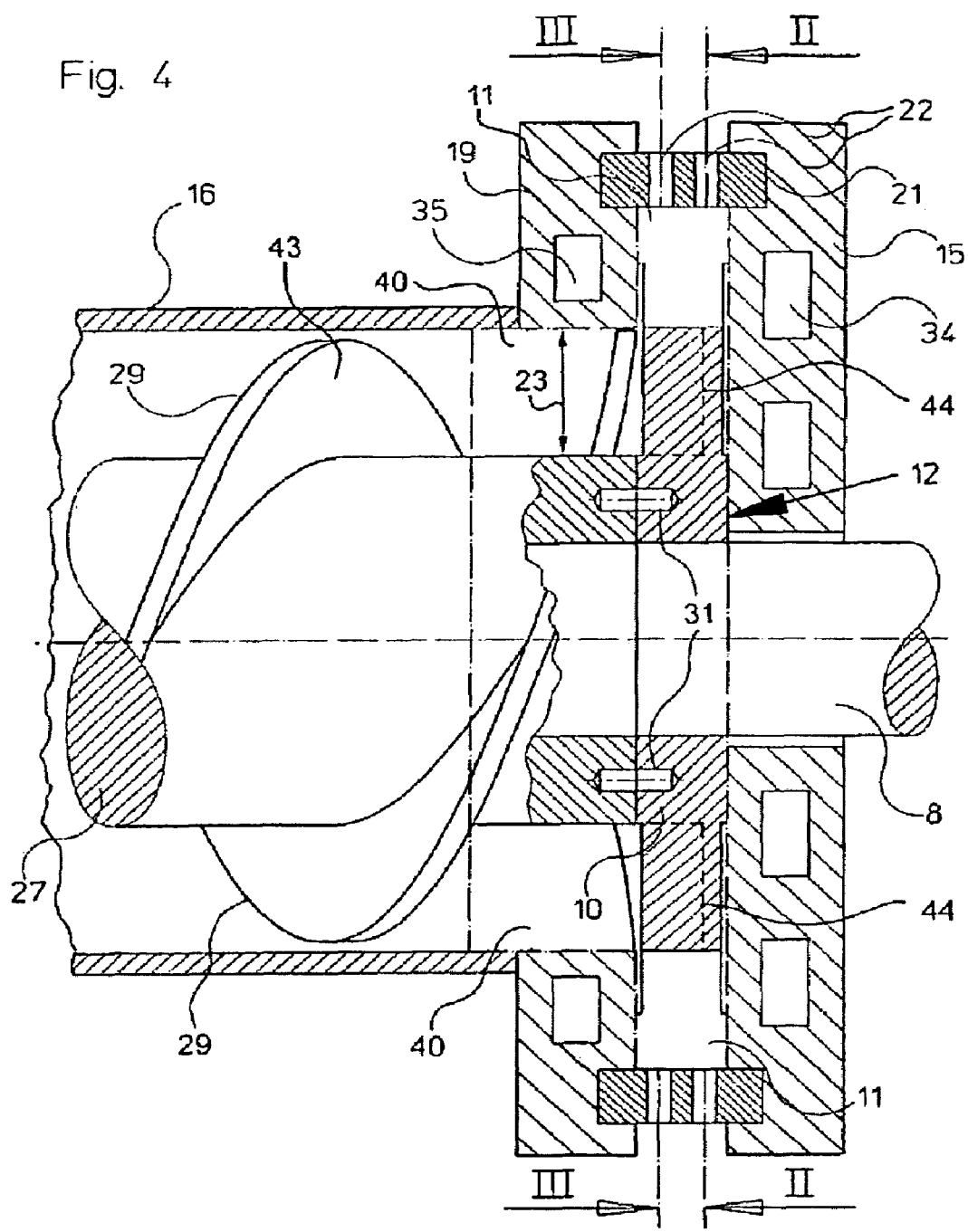
FIG. 4 is a longitudinal section through a subsection of the apparatus shown in FIG. 2 along line IV-IV.

FIGS. 2, 3 and 4 show this area in different segments, where the relative position of the screw spirals 29 and pressure element 12 is particularly evident. FIG. 3 shows a cross-section facing in the direction of material flow, while FIG. 2 shows the opposite direction of view.

Visible on a larger scale are the perforated die 21 with radial passages 22, which coaxially surrounds the axis of rotation 1 and in doing so encloses the disk-shaped working chamber 20, which is bounded in the axial direction by the annular walls 15 and 19. The annular walls 15 and 19 may be equipped with cooling channels 34 and 35 in order to influence temperature development within the apparatus. On the feed side, the outer sleeve 16 seals the conveyor screw 17 to the central opening 40 of the annular wall 19. Inside the outer sleeve 16, the conveyor screw 17 rotates the screw core 27 with the screw spirals 29 spiraling around it.

The pressure element 12 is seated in a rotationally fixed manner with its hub 10 on the last section of the drive shaft 8. Extending radially from the hub 10 are two blade-like pressure arms 11, which are located opposite one another with radial symmetry relative to the axis of rotation 1, and which occupy approximately half of the working chamber 20. The other half is divided into a compaction chamber 38 between the opening 40 and perforated die 21, and a redirection region 41 adjoining the hub 10 in the same radial plane, in which region the screw spirals 29 of the conveyor screw 17 terminate at their contact surfaces 43. A circulating motion of the compaction chamber 38 and redirection region 41 results during the course of the rotation of the pressure element 12.

The pressure arms 11 of the pressure element 12 have a front side 37 which is effective for compaction in the direction of rotation 36, and extends in a straight line in the redirection region 41. In contrast, the outwardly adjacent region of the front side 37 located in the compaction region 38 has a curvature opposite the direction of rotation 36. In this way, the pressure arms 11 in the region of the compression chamber 38 form two wedge-shaped compression zones 39, shown with cross-hatching in FIG. 2, which revolve during the course of the rotation.

In an axial projection, the opening 40 and the front side 37 of each pressure arm 11 intersect at point S (FIGS. 2 and 3). The radial line originating at the axis of rotation 1 and extending through the point S is labeled 42. Extending from the radial line 42, opposite the direction of rotation 36, is the compression zone 39, which, with an angular dimension of −90° ends where front side 37 of each pressure 11 forms a sliding termination to the perforated die 21. The region adjoining the radial line 42 in the direction of rotation 36 is composed jointly of the redirection region 41 and the compaction chamber 38, and ends where the pressure blade 11 has its rear edge in the direction of rotation 36. In the present example, that is the case at an angular dimension of approximately +80° originating from the radial line 42. In the adjacent region to the annular gap 23, moreover, each pressure arm 11 can have depressions 44 on the face surface facing the conveyor screw 17, in order to make the flow cross-section as large as possible.

In addition, each point S represents the end of the contact surfaces 43 of the screw spirals 29. In this regard, the pitch of the screw spirals 29 in the end region can be chosen such that a tangential surface transition of the contact surfaces 43 to the annular wall 19, and thus to the compaction chamber 38, takes place.

Below, the flow of the feed material through an inventive device is explained in detail with additional reference to FIG. 5. First, a flow cross-section is available to the feed material located in the conveyor screw 17 that is limited by the axial spacing of two adjacent screw spirals 29 and by the radial distance between the outer sleeve 16 and the screw core 27 of the conveyor screw 17. This flow cross-section remains essentially constant over the length of the conveyor screw 17, as the profile of the curve shown in section A-B in FIG. 5 also shows.

At the end of the conveyor screw 17, the feed material is conveyed by the screw spirals 29 through the annular gap 23 into the working chamber 20. In this regard, at the same time the feed material enters the redirection region 41 of the working chamber 20, an abrupt increase in the flow cross-section takes place by the cross-sectional area of the compaction chamber 38. This situation corresponds to a section in FIG. 2 at the radial line +80° and in FIG. 5 to the curve section B-C. The greatest flow cross-section is achieved when the flow cross-section is increased by the cross-sectional area of the compaction chamber 38. However, at this point in time the feed material is not yet distributed uniformly over the entire flow cross-section, but instead is concentrated in the redirection region 41. By way of contrast, a material vacuum exists in the compaction chamber 38. These circumstances contribute to a change in the feed material direction from an axial direction of motion to a radial direction.

At the same time as the maximum flow cross-section is reached, a continuous compaction of the feed material is started by reducing the flow cross-section. This is accomplished, firstly, by the continuous pitch of the screw spirals 29 to their terminations at the points S at the level of the plane of separation between the annular wall 19 and the pressure arms 11. Secondly, the flow cross-section is additionally reduced by the profile of the contact surface 37, which continually reduces the width of the redirection region 41 until the redirection region 41 has completely disappeared at the point S. In this way, the existing flow cross-section is steadily reduced to a cross-sectional area that, at the plane of the radial line 42, is now only made available in the compaction chamber 38. The compaction of the feed material up to this point corresponds to the curve segment C-S in FIG. 5, or the region between the radial lines of +80° to 0° in FIG. 2.

The flow cross-section is continuously reduced further by persistent rotation of the pressure element 12 as a result of the curved contact surface 37, until the flow cross-section assumes the value of zero in the region of the radial line −90°, where the pressure arm 11 forms a sliding connection to the perforated die 21. The pressure and temperature increase occurring during the course of the continuing reduction of the flow cross-section causes the feed material to pass through the openings 22 of the perforated die 21, during which process the feed material briefly transitions to a plastic state and agglomerates. The agglomerate is subsequently stripped off the outside of the perforated die 21 by the revolving blades 26.

Figure 5:
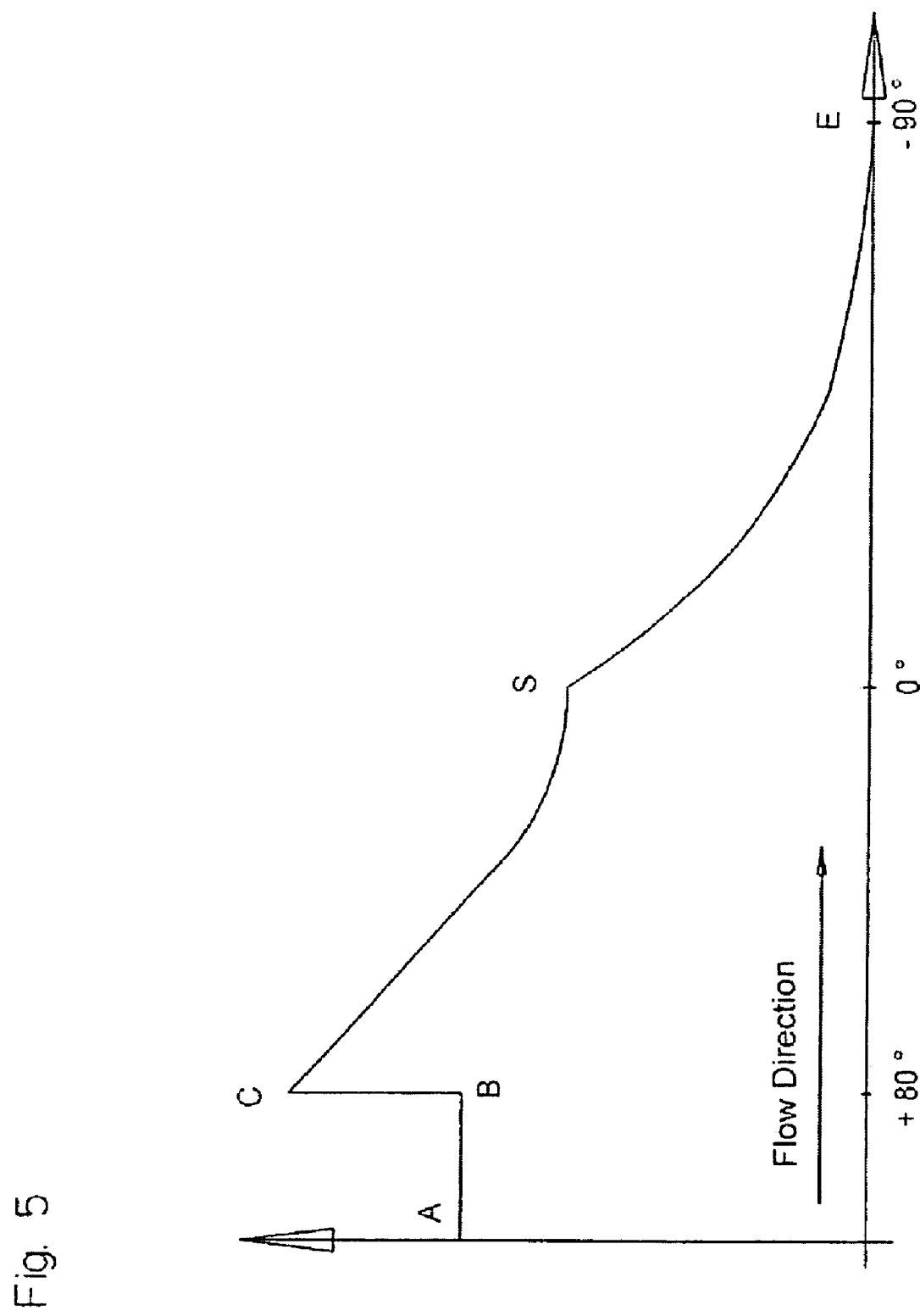
FIG. 5 shows a profile of the flow cross-section of the feed material during passage through the apparatus.

FIG. 5 clearly shows the sudden increase of the flow cross-section when the feed material enters the redirection region 41, by which means a redirection of the material flow is supported. This is followed by a continuous reduction in the flow cross-section in two stages with simultaneous temperature and pressure buildup in the working chamber 20. The first segment concerns the region until the plane of intersection through the radial line 42 is reached, which terminates the axial conveyance of the feed material by the screw spirals 29. The second region corresponds to the segment between the planes of intersection through the radial lines at 0° and 90°, where compaction only takes place between the perforated die 22 and the contact surface 37 of the pressure element 12.

In the present example, the curve profile shows a point of discontinuity in the transition region S between these two regions. The invention is not limited to such a profile, but rather also includes embodiments with a constant reduction in flow cross-section.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for converting free-flowing, at least partially thermoplastic feed material, such as films, fibers, foams, powders, and the like, into granules, agglomerates, pellets, compacts, and the like, under the application of pressure, the apparatus comprising:

a conveyor screw being arranged about an axis of rotation, the conveyor screw having at least one screw spiral and is located within a screw housing;

a rotationally symmetric working chamber arranged about the axis of rotation, the working chamber being formed by two annular walls arranged at an axial distance from one another and by an annular perforated die that is encompassed by the annular walls;

a central opening formed in one of the annular walls, the central opening being arranged coaxial to the axis of rotation such that the conveyor screw discharges feed material towards the working chamber; a region of the working chamber between the central opening and the perforated die forming a compaction chamber; and a pressure element provided within the working chamber that rotates about the axis of rotation and that has at least one pressure arm, which extends from the axis of rotation toward the perforated die and whose front side in the direction of rotation forms a contact surface that delivers the axially supplied feed material to the perforated die in the radial direction and compacts it while doing so, wherein the pressure element and the conveyor screw are positioned relative to one another such that, proceeding from a radial line through a point of intersection S of the front side of the pressure arm with the central opening of the first annular wall, an end of the contact surface of the screw spiral is located within a sector from about 30° opposite the direction of rotation to about 40° in the direction of rotation referenced to the radial line.

2. The apparatus according to claim 1, wherein the pressure element and the conveyor screw are positioned relative to one another such that, starting from the radial line through the point of intersection S of the contact surface of the pressure arm with the central opening of the first annular wall, the end of the contact surface of the screw spiral is located within a sector from about 20° opposite the direction of rotation to about 20° in the direction of rotation referenced to the radial line.

3. The apparatus according to claim 1, wherein the pressure element and the conveyor screw are positioned relative to one another such that the end of the contact surface of the screw spiral is located at the point of intersection S of the front side of the pressure arm with the central opening of the first annular wall.

4. The apparatus according to claim 1, wherein the contact surface of the screw spiral terminates in a radial plane between the annular wall and the working chamber.

5. The apparatus according to claim 4, wherein the contact surface of the screw spiral discharges the feed material tangentially into the compaction chamber.

6. The apparatus according to claim 1, wherein the front side of the pressure arm is curved opposite to the direction of rotation.

7. The apparatus according to claim 5, wherein the front side of the pressure arm is only curved in the region of the compaction chamber.

8. The apparatus according to claim 1, wherein the pressure element has depressions in its side facing the screw spiral.

9. The apparatus according to claim 1, wherein the number of pressure arms of the pressure element corresponds to the number of screw spirals of the conveyor screw.

10. The apparatus according to claim 1, wherein the pressure element has two pressure arms, which are located opposite one another with radial symmetry relative to the axis of rotation.

11. The apparatus according to claim 1, wherein a rear side of the pressure arm in the direction of rotation is offset by about 90° opposite the direction of rotation from the radial line through the point S.

12. The apparatus according to claim 1, wherein the conveyor screw and the pressure element have a common drive shaft.

13. The apparatus according to claim 1, wherein the pressure element and at least the end section of the conveyor screw associated with the pressure element are formed as one piece.

14. The apparatus according to claim 1, wherein the conveyor screw and the pressure element are formed as two pieces, and are frictionally connected to one another at their junction by a coupling.

* * * * *